United States Patent
Tonn et al.

(10) Patent No.: US 10,112,752 B2
(45) Date of Patent: Oct. 30, 2018

(54) TUMBLER LID WITH RESERVOIR AND REPETITIVE MEASURING AND DISBURSEMENT MECHANISM

(71) Applicant: Toddy Tech, LLC, Bozeman, MT (US)

(72) Inventors: Andrew Tonn, Bozeman, MT (US); Stephen Sanford, Bozeman, MT (US); David Yakos, Bozeman, MT (US); Joel R. Switzer, Belgrade, MT (US)

(73) Assignee: Toddy Tech, LLC, Bozeman, MT (US)

( * ) Notice: Subject to any disclaimer, the term of this patent is extended or adjusted under 35 U.S.C. 154(b) by 0 days.

(21) Appl. No.: 15/658,205

(22) Filed: Jul. 24, 2017

(65) Prior Publication Data

US 2018/0186529 A1 Jul. 5, 2018

Related U.S. Application Data

(60) Provisional application No. 62/441,484, filed on Jan. 2, 2017.

(51) Int. Cl.
| | |
|---|---|
| *B65D 51/00* | (2006.01) |
| *B65D 51/28* | (2006.01) |
| *B65D 43/02* | (2006.01) |
| *B65D 43/16* | (2006.01) |
| *B65D 47/06* | (2006.01) |
| *B65D 51/18* | (2006.01) |

(52) U.S. Cl.
CPC ......... *B65D 51/2892* (2013.01); *B65D 43/02* (2013.01); *B65D 43/16* (2013.01); *B65D 47/06* (2013.01); *B65D 51/18* (2013.01); *B65D 2251/009* (2013.01); *B65D 2251/0018* (2013.01); *B65D 2251/0028* (2013.01); *B65D 2251/0081* (2013.01); *B65D 2251/0087* (2013.01); *B65D 2543/00046* (2013.01)

(58) Field of Classification Search
CPC ........ B65D 41/00; B65D 51/00; B65D 51/24; B65D 51/28; B65D 51/39; B65D 51/2807; Y10S 215/08
USPC ......................................................... 206/221
See application file for complete search history.

(56) References Cited

U.S. PATENT DOCUMENTS

| | | | |
|---|---|---|---|
| 2,438,906 A | 4/1945 | Elsas et al. | |
| 2,750,066 A | 7/1953 | Shekter | |
| 3,477,431 A | 11/1969 | Walecka | |
| 4,449,645 A | 5/1984 | Korwin et al. | |

(Continued)

FOREIGN PATENT DOCUMENTS

WO 2015169822 11/2015

*Primary Examiner* — King M Chu
(74) *Attorney, Agent, or Firm* — George C. Rondeau, Jr.; Davis Wright Tremaine LLP

(57) ABSTRACT

This container lid fits onto existing insulated cups. It has a refillable and sealable reservoir with a top opening to receive substances and a bottom opening to release substances into a container. The release of substances is controlled and measured before release. A double piston and button combination interact with a narrow section of the reservoir to dispense only a portion of the contents from the reservoir into the container. The released portion is carefully metered within the narrow channel when the double piston alternately seals a first opening and a second opening of the narrow channel. The reservoir serves to store the unreleased substance until the next time the button is activated to release addition substance into the container.

22 Claims, 8 Drawing Sheets

(56) References Cited

U.S. PATENT DOCUMENTS

| | | | |
|---|---|---|---|
| 5,325,996 A | 7/1994 | Bannigan | |
| 5,863,126 A | 1/1999 | Guild | |
| 6,540,112 B1 | 4/2003 | Studnik | |
| 6,565,743 B1 * | 5/2003 | Poirier | B65D 51/00 116/284 |
| 6,945,393 B2 | 9/2005 | Cho | |
| 7,918,336 B2 | 4/2011 | Olsen et al. | |
| 8,267,276 B2 | 9/2012 | Francomano | |
| 8,453,834 B2 | 6/2013 | Porter | |
| 8,453,883 B2 | 6/2013 | Porter | |
| 8,474,611 B2 | 7/2013 | Marco | |
| 8,746,476 B1 * | 6/2014 | Clause | B65D 47/36 206/222 |
| 8,857,665 B2 | 10/2014 | Owoc | |
| 8,875,926 B2 | 11/2014 | Grajqevci | |
| 9,215,954 B2 | 12/2015 | Bennett | |
| 2004/0118709 A1 | 6/2004 | Cho | |
| 2006/0175330 A1 | 8/2006 | Richardson | |
| 2007/0102394 A1 | 5/2007 | Olsen et al. | |
| 2008/0067084 A1 | 3/2008 | Patterson et al. | |
| 2009/0321380 A1 | 12/2009 | Francomano | |
| 2010/0025268 A1 | 2/2010 | Lee et al. | |
| 2010/0037780 A1 | 2/2010 | Pas et al. | |
| 2010/0044377 A1 | 2/2010 | Porter | |
| 2011/0068102 A1 | 3/2011 | Porter | |
| 2011/0089059 A1 | 4/2011 | Lane et al. | |
| 2011/0272301 A1 | 11/2011 | Saulle | |
| 2012/0024861 A1 | 2/2012 | Otsuka et al. | |
| 2013/0119087 A1 | 5/2013 | Owoc | |
| 2013/0240535 A1 | 9/2013 | Grajqevci | |
| 2013/0327788 A1 | 12/2013 | Roth et al. | |
| 2014/0166510 A1 | 6/2014 | Frutin | |
| 2014/0361016 A1 | 12/2014 | Moreau | |
| 2015/0036455 A1 | 2/2015 | Bennett | |
| 2015/0076012 A1 | 3/2015 | Davis et al. | |
| 2016/0159632 A1 | 6/2016 | Wheatley et al. | |
| 2016/0207675 A1 | 7/2016 | Ruhnau | |

* cited by examiner

TUMBLER LID WITH RESERVOIR AND REPETITIVE MEASURING AND DISBURSEMENT MECHANISM

CROSS-REFERENCE TO RELATED APPLICATIONS

This patent application claims priority under 35 U.S.C. § 119(e) to U.S. Provisional Patent Application Ser. No. 62/441,484, entitled "Beverage Container with Metered Lid", and filed on Jan. 2, 2017. The entire disclosure of that provisional patent application is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to a lid received by an insulated cup, and more particularly to such an attachable container lid with a sealed reservoir isolated from the contents of the cup for holding and selectively dispensing additive substances.

2. Description of the Related Art

Reusable beverage containers and insulated tumbler cups and mugs are known in the art and many conventional models are available on the market. The standard models of these refillable and reusable "go-cups," travel mugs, and water bottles are typically sold with a removable lid and those removable lids typically encompass a closeable drinking access. Some cup models are vacuum-sealed with double walls to improve insulation even further.

Insulated cups are used widely for both hot and cold beverages. Yeti® Rambler Tumblers are particularly popular and these cups work great to keep drinks cool. They are also very popular for use during social functions including sporting events and outdoor adventures. Because flavoring, creamer, liquors, or spirits are used in smaller proportion to the primary beverage, there is a need to transport these additives separately from the insulated cup when one wishes to replenish the primary beverage on the go. If a cocktail is desired, an individual must port around a flask, or some other glass or plastic container to pour liquids into the primary beverage. Furthermore, the selection and quantity of additives are a matter of personal choice, so while the primary beverages may be more readily available to refill the primary container, the additives may require transport by an individual or transport of many various containers to serve multiple individuals. Transporting additives separately from insulated containers on hot days results in the additives becoming too warm to consume or leaving the mixed beverage warmer than desired or even watering down the primary beverage due to melting of ice. When on the go, measuring the right amount of an additive is challenging and can lead to undesirable proportions in the mixture of additive to the primary beverage, leaving mixed drinks either over or under poured.

Individuals have turned to employing separate containers such as flasks or mini-bar size bottles to transport spirits or liquors. Companies have begun providing flavoring and creamers in plastic-disposable servings to meet the tastes of people on the go. Prior attempts to permit the transport of beverage flavorings in conjunction with the go-cups have failed because they have universally required one-time use through the breaking of a membrane or a tearing or puncturing of a seal. While some prior art has taught to have button actuation release of the content from the compartment to the cup without removal of the lid, those attempts have required a single-use of at least an additive vessel inserted within the lid. Personalization of the insertion of flavoring additives to a travel cup have been addressed only by the use of multiple compartments which require the breaking or tearing of multiple single-use membranes. In many cases the activation of an additive chamber results in the prevention of any further use of the entire lid so that the entire lid is disposable.

While the multi-compartments have the ability to release only a pre-measured, set amount, they are cumbersome to operate because each compartment requires an individual releasing mechanism or the ability to turn or move the actuating mechanism to release the contents of the compartments. The prior art generally teaches that discharged containers should be locked open and any additive stored in a compartment should be completely discharged upon deployment.

Many inventions must be removed in order to drink the contents of the beverage container. Other inventions have sought ways to add a small amount of additive when a container is tipped for pouring. In one example, a compartment released an additive into the outflow of a container and thus only when the lid was properly rotated and the beverage container was horizontally tipped. While creating a compartment for an additive within the lid, these efforts have removed the ability for the lid to allow fluid transfer for direct drinking. Another invention dripped additive into the stream of a soda after a large lid and cover was attached to the exterior of a soda can. As with the prior example, the additive is only mixed with the beverage flow when it exits the container's spout. The prior art is occupied with cumbersome attachments that are difficult to manufacture and require wasteful utilization of single-use vessels or sophisticated titrating with reservoirs that are not reusable or refillable.

BRIEF SUMMARY OF THE INVENTION

The container lid of the present invention is for use with a beverage container such as an insulated travel mug or tumbler cup. The lid has a refillable and resealable reservoir, and a button to actuate a reciprocating sealing mechanism for the controlled and repeatable measuring and dispensing of contents from a storage reservoir into the beverage container. The lid is desirably sized to fit most brands of conventional beverage containers. The use of a coupling such as a tapered ledge with an annular seal will permit the lid to reliably and repeatedly attach to the interior wall of various insulated cups such as by an interference fit.

This lid for a beverage container comprises: a refillable reservoir with a measuring channel in the shape of a tube and a reciprocating sealing mechanism to selectively block the tube and permit an additive to move into the measuring channel from the reservoir and then, after sealing the reservoir, releases the additive out of the measuring channel into the beverage container. The reciprocating sealing mechanism preferably takes the form of a double piston or plunger mechanically connected to an actuating mechanism in the form of a button located at the top of the lid. The double piston has seals that radially interface with the walls of the measuring tube. Through the use of the button a user will move the upper and lower piston portions and therefore also the seals through a series of stations and the reciprocating sealing mechanism will selectively: block the distal aperture of the measuring channel while simultaneously unblocking the proximal aperture of the measuring channel; simultaneously block the proximal aperture of the measuring channel and the distal aperture; block the proximal aperture of the measuring channel while simultaneously unblocking the distal aperture of the measuring channel, and the many various stages in between these enumerated stations. In the default position, the lower, distal piston seal blocks the middle to bottom of the measuring channel. In this position, additive will spill into the channel. If the reservoir is full at the time of use, the measuring channel will fill with up to its maximum volume of additive. When the button is pressed the entire double piston will move down. Because the double piston is sized to simultaneously close the upper and lower opening of the measuring tube, the tube will fill with additive until the upper seal of the piston blocks the upper opening of the tube. For a time, while the upper, proximal piston seal and lower piston seal are both within the tube of the measuring channel, the additive will be sealed within the measuring channel. As the piston continues to descend, the lower seal of the piston will separate from the lid's open end. Since the lower seal is no longer formed with the walls of the tube, the additive that was housed in the measuring channel spills out of the tube and into the interior of the cup. Thus, with one push of the button, a known quantity of additive will enter the cup and then with a second push of the button the piston movement will be repeated and another known quantity of additive will enter the cup. In the preferred embodiment, each press of the button will dispense approximately ½ ounce, or about 15 milliliters.

The reservoir is refillable because it has an access hatch, also called a filling port, which is easily accessed and used to refill the additive contents stored in the reservoir. The stored contents of the reservoir do not come into contact with the tumbler's contents. Only additive released from the bottom of the measuring tube will enter and mix with the tumbler contents while the remaining additive is securely stored. Ideally, the reservoir will hold approximately 2-7 ounces (about 60-210 mL). The preferred access hatch will include a hinged door with securing closures and surrounding seals. In the preferred embodiment, the lid is constructed of a clear resin which allows a user to observe when the reservoir is depleted without opening the filling access hatch.

The lid includes a stand-alone drinking access that allows a user of an insulated cup to enjoy the contents of the cup without worrying about spilling or any further mixing of the contents of the reservoir with the primary beverage. In the preferred embodiment, the drinking access is surrounded by a wall that partitions the drinking access from the cup and the rest of the lid. In alternative embodiments, one side of the drinking channel may be formed by the interior wall of the tumbler.

More specifically, and in a presently preferred embodiment, by way of example and not necessarily by way of limitation, a preferred lid for a tumbler has a lower portion creating a reservoir and an upper portion to cover and access the reservoir for filling. Extending below the reservoir is a narrowed tube with an open bottom. A first piston seal segregates the base of the tube to separate contents in the reservoir from the cup. A second piston, parallel to the first piston, is within the reservoir resting just above the tube to allow contents of the reservoir to fill the tube. An actuating mechanism in the form of a button is simultaneously affixed to the two pistons by a shaft. When the actuating mechanism is partially engaged the first piston and second piston move down the tube, sealing the transferred contents within the tube and excluding further contents from entering the tube. When the actuating mechanism is completely engaged the first piston extends past the bottom tube opening to release the tube's content into the tumbler and the second piston remains within the tube to prevent the remaining reservoir contents from escaping.

The present invention meets the need for a refillable reservoir lid which can repeatedly release measured quantities of a single additive into a cup's interior cavity. The present invention stores and then moves liquid from one refillable reservoir to the cup's refillable reservoir. The present invention is a single lid with an additive reservoir for storing contents in a segregated compartment. The lid has the ability to measure and release only a portion of the storage compartment contents without removing the lid. Since the compartment is integrated into a reusable lid that is adapted to fit most commercial tumblers there is very little waste associated with the product. The lid meets the needs to provide a visible transfer of liquid into a tumbler which may be opaque. The lid further meets the need to aid in the insulation objectives of the tumbler in that the materials used are insulating and the additive will maintain a temperature consistent with the contents of the tumbler. The present invention also provides a drinking access that operates independently from the additive reservoir thus preventing any mixing and allowing the normal use of the tumbler even when the lid's features are not employed. In the event that the device is used to transport liquor or spirits, the lid integrates into the tumbler so that the user has less to carry, can carry the substances discretely, and have a much easier and predictable dispensing mechanism when in an environment without access to measuring tools. Finally, by releasing a measured and known quantity, the risk of mistaken over saturation of a concentrated additive due to overpouring is reduced and safety is enhanced.

The commercial embodiment of the present invention, branded as "FlasKap," boasts a shot-dispensing lid for a stainless-steel travel tumbler. Not only does the FlasKap keep beverages insulated and splash free, but it dispenses a favorite beverage enhancer in quantities of ½ shot (½ Ounce (oz.)) at a time with the push of a button. The FlasKap lid is initially offered in two convenient sizes to perfectly fit almost any stainless-steel tumbler. A 7-ounce FlasKap lid stores up to 7 oz. and fits onto taller tumblers ranging from about 30-35 ounces. A 5-ounce FlasKap lid holds up to 5 oz. and fits smaller (20-24 oz.) tumblers. In most instances, a lid-volume to cup-volume ratio of about 1:5 will be desirable. Within the lid, a storage-volume to metering-volume ratio of about 1:12 is preferred. The FlasKap branded lid is anticipated to be useful for sporting events/tailgating, outdoor concerts/festivals, at the beach, on the boat, floating the river, golfing, fishing, camping or other outdoor adventures, relaxing at home (BBQ, Pool, Deck, Porch), or if no alcohol is being consumed then, while riding an ATV/UTV/Quad/or Side By Side—just to name a few.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

LIST OF REFERENCE NUMERALS

Figure 1:
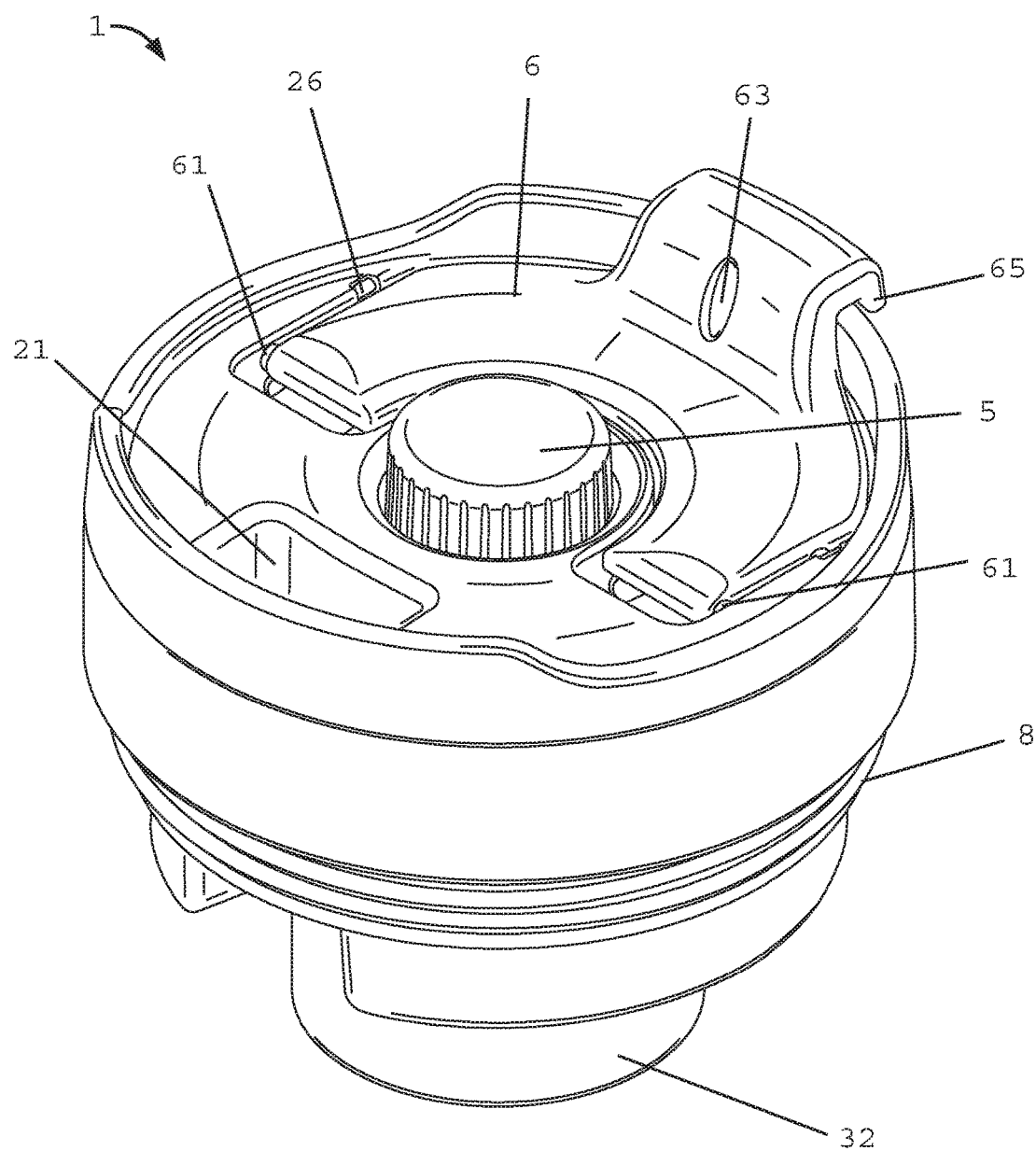
FIG. 1 is a perspective view of the preferred embodiment of the present invention with the reservoir access hatch shown in a closed position.

1 Lid
  11 Open bottom
  12 Reservoir
2 Lid top/upper reservoir
  21 Straw/drinking hole/drinking channel
  22 Reservoir hole/filling port
  23 Vent hole
  24 Button recess
  25 Top alignment lip
  26 Peg recess
  27 Hinge receiving hole
  28 Reservoir Vent
  29 Opening ledge/lift tab
3 Lid bottom/lower reservoir
  31 Bottom straw hole
  32 Metering tube
  33 Bottom vent hole
  34 Ledge for seal
  35 Alignment lip
  36 Ledge for cup
4 Double piston/double plunger
  41 Upper piston
  42 Upper piston seal
  43 Lower piston
  44 Lower piston seal
  45 Shaft receiving hole
5 Actuating mechanism
  51 Button
  52 Threading insert
  53 Spring
  54 Shaft seal
  55 Threaded shaft
6 Fill lid/Reservoir cover
  61 Hinge
  62 Securing peg
  63 Vent hole
  64 Fill lid seal/cover seal
  65 Opening ledge
7 Cup/Container
  71 Interior wall
  72 Interior cavity
8 Cup seal/gasket
9 Additive/Substance
  91 Stored substance
  92 Metered substance
  93 Released substance

DETAILED DESCRIPTION OF THE INVENTION

Figure 2:
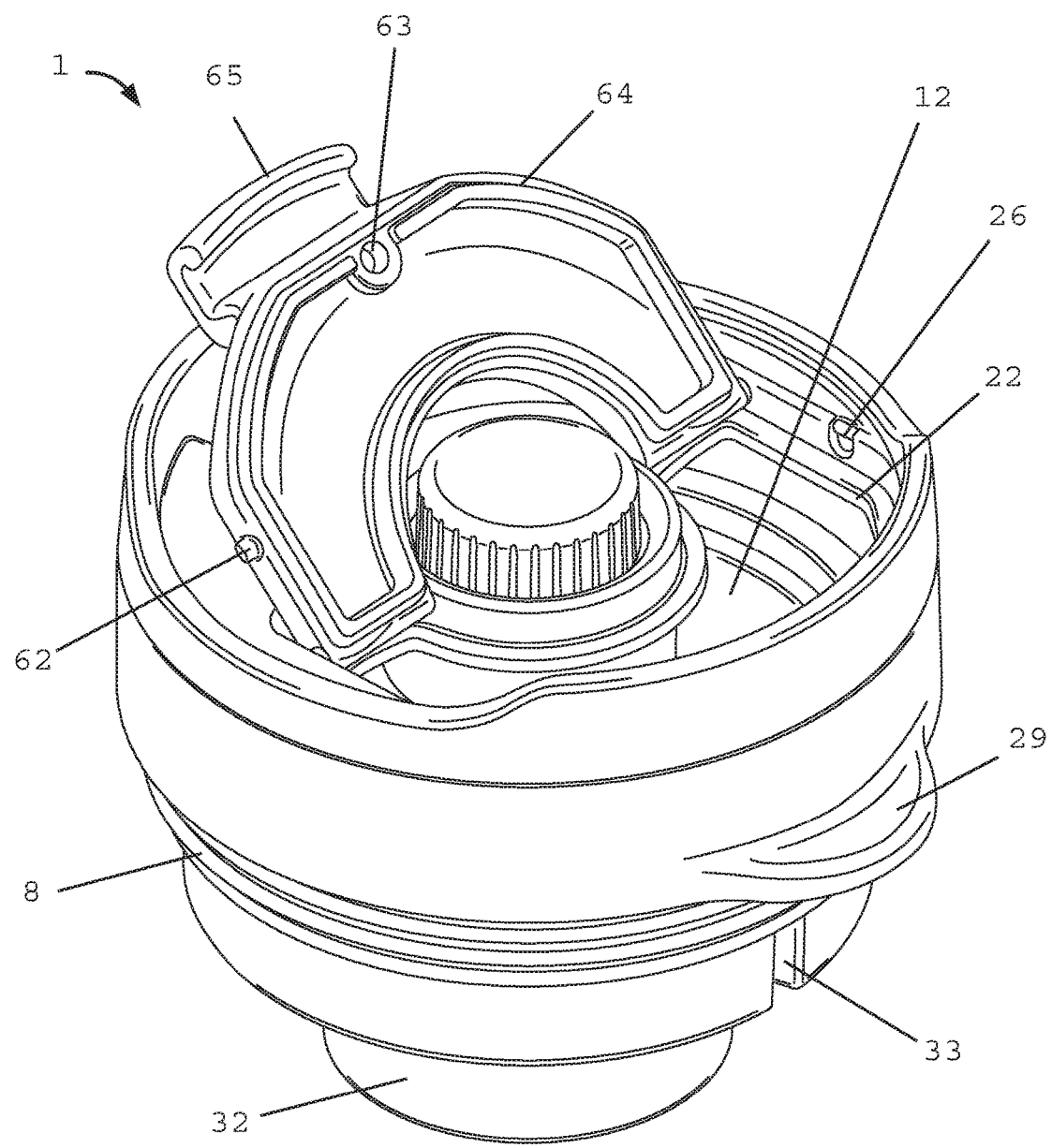
FIG. 2 is a second perspective view of the preferred embodiment of the present invention with the reservoir access hatch shown in an open position.

FIGS. 1 and 2 show a reservoir lid 1 in its commercial form. The lid 1 will be sold as an accessory to be placed on an existing beverage container such as the tumblers sold under major cup brands like Yeti®, Ozark Trail™, Grizzly™, Reduce™, Rtic® and others. The lid 1 of the present invention will be sold as a single branded unit but may also be co-branded or sold with a tumbler included. The lid is not exclusively for use on tumblers but will find applications for any compatible beverage container or insulated beverage container which will receive the lid's circumference and join with its gasket seal 8. Herein, a compatible beverage container may be referenced collectively as a tumbler or a cup 7 but general reference is intended. The entirety of a beverage container may be referenced but an entire tumbler is not shown.

Figure 7:
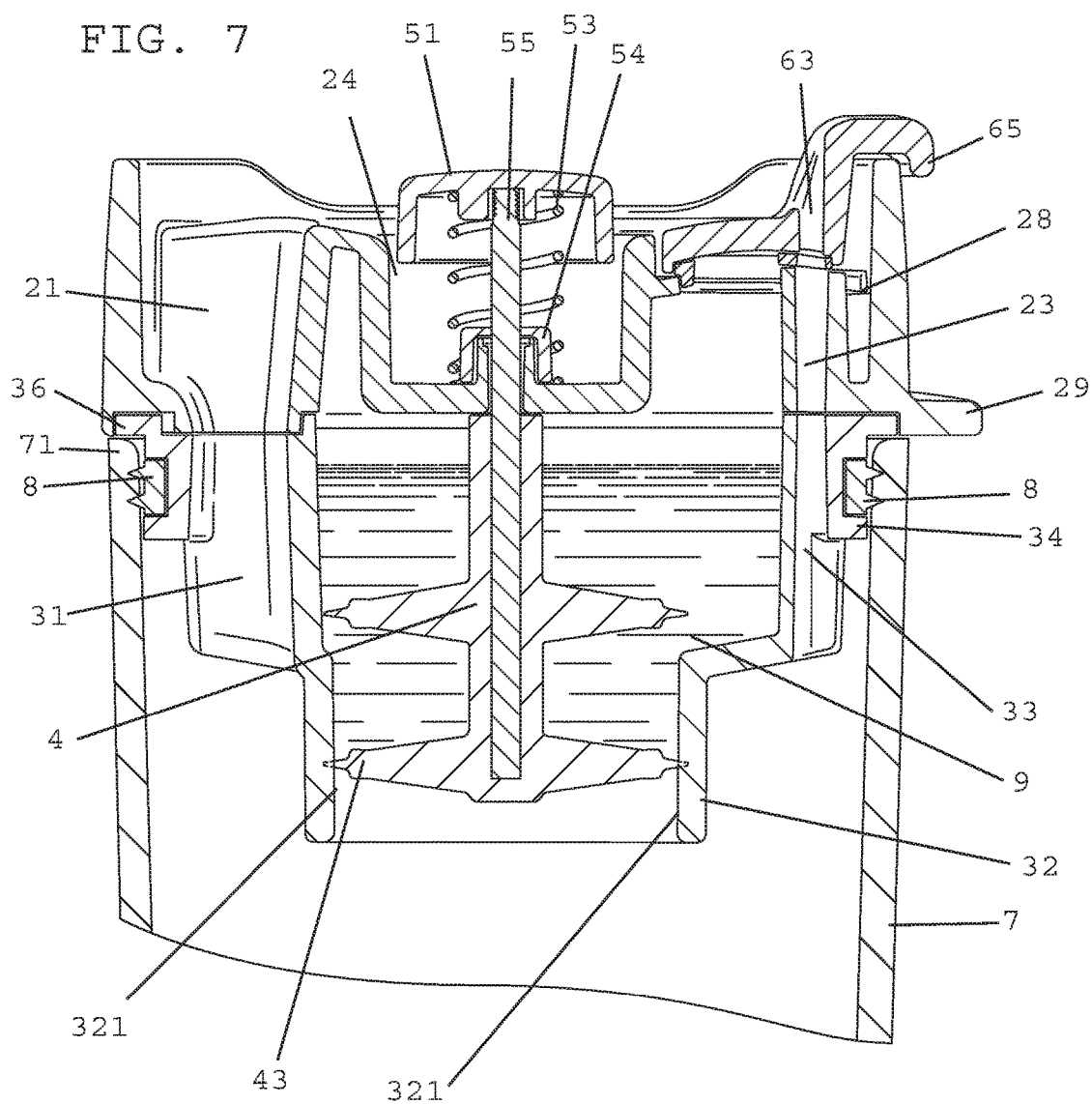
FIG. 7 is a cross-sectional view of the preferred embodiment of the present invention with the actuating mechanism in a resting position and additive partially filling the measuring channel.
Figure 8:
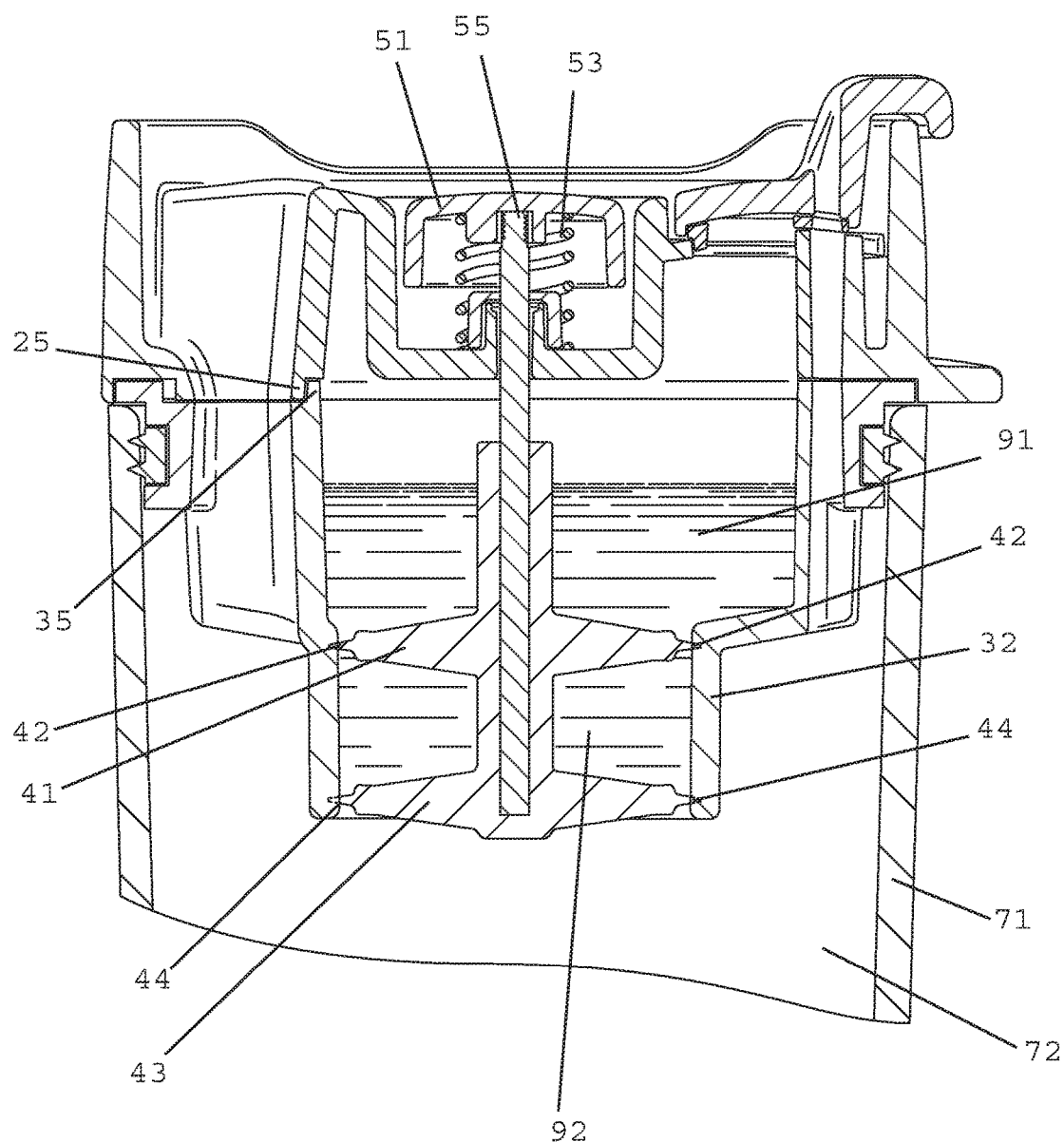
FIG. 8 is a cross-sectional view of the preferred embodiment of the present invention with the actuating mechanism partially engaged and metering the additive before distribution.
Figure 9:
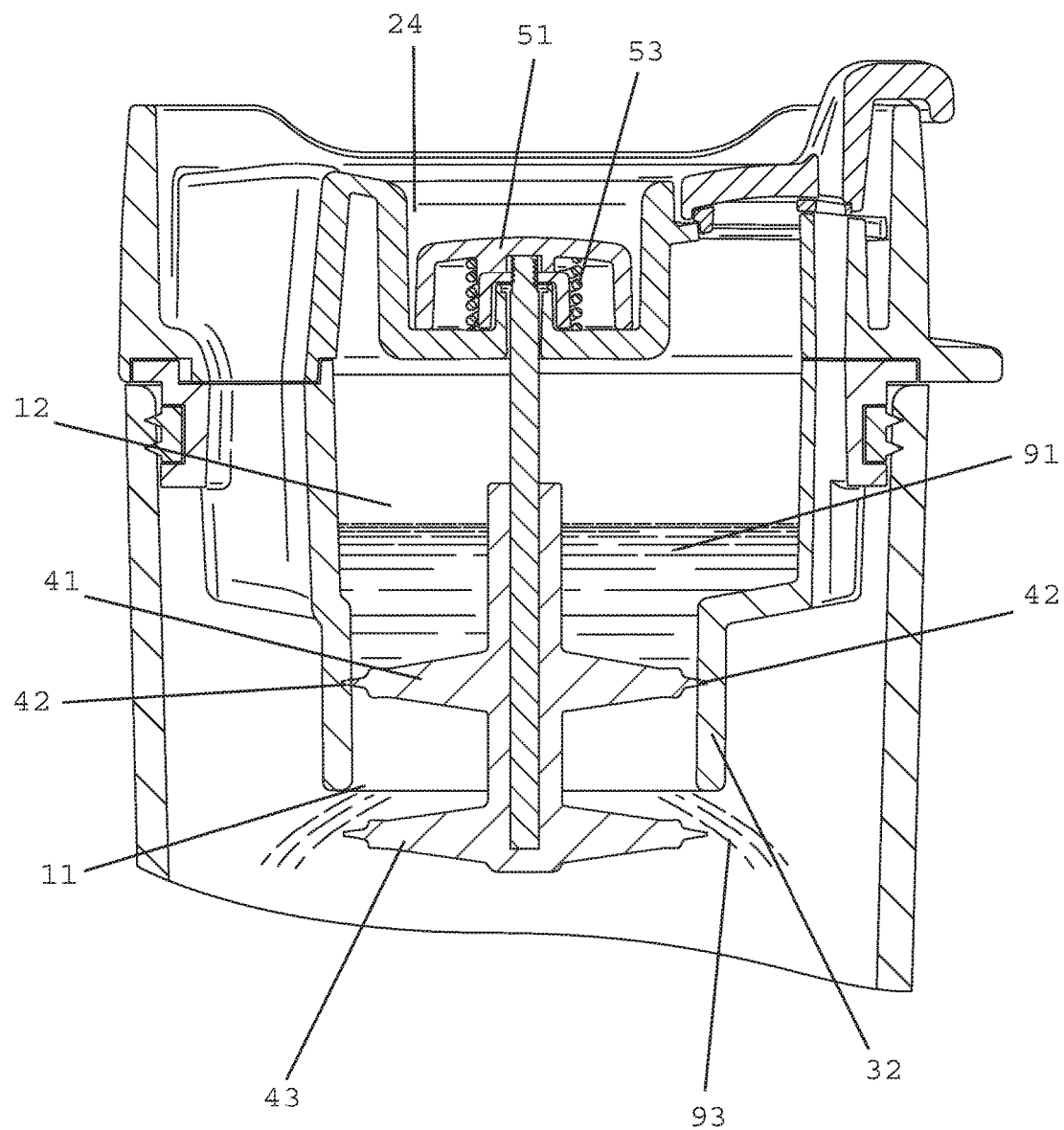
FIG. 9 is a cross-sectional view of the preferred embodiment of the present invention with the actuating mechanism fully engaged and dispensing the metered contents into the cup.

With continuing reference to FIGS. 1 and 2, the present invention is friction fit into a tumbler 7 as shown in FIGS. 7-9. Sizing of the unit plus the use of a gasket seal 8 establishes a liquid-tight seal with the tumbler. At least everything below the gasket 8 recesses down into the tumbler 7 including a good portion of a storage reservoir 12 with a narrow, measuring channel in the form of a measuring tube 32 where contents of the reservoir 12 are ready to be metered and dispensed through the open bottom 11 (best visible in FIG. 9). The double piston 4 works in conjunction with the interior side walls 321 within the metering tube 32. Depending on which aperture of the measuring channel is sealed, the measuring channel is in fluid communication with either the reservoir or with the beverage container or if both apertures are sealed then no liquid moves into or out of the measuring channel 32.

Above the gasket 8 is the portion of the lid 1 that sits at or near the top of the tumbler 7. A button actuating mechanism 5 is provided in this section of the lid as shown in FIG. 1. A drinking hole 21, also called a drinking access, allows a user to use the tumbler 7 for normal drinking functions. A venting hole 63 extends from the cavity 72 of the cup 7 all the way through the opening ledge 65 and permits air to flow into and out of the cavity 72 when a user is drinking. In the preferred embodiment, the lid 1 includes a lift tab 29 (shown in FIG. 2) to assist in removing the lid 1 from a tumbler 7. This feature serves as a plying aid to assist in the removal of the lid from the tumbler 7 for refilling of the tumbler. The lift tab 29 may also be helpful in some alternative embodiments for separating the top lid 2 and bottom lid 3 of the preferred embodiment before cleaning.

In order to begin using the preferred embodiment, a compatible tumbler 7 is first filled with a primary beverage such as soda, coffee, juice, tea, water, or the like. Next, the reservoir lid 1 is inserted into the top opening of the tumbler and pressed down until the gasket 8 reliably seals with the interior surface 71 of the tumbler 7. (See FIGS. 7-9.) The lid must be attached in a liquid-tight manner on the container and the liquid-tight connection must withstand the emptying of the container and drinking from the cup through the drinking access without allowing leaking from the cup and lid connection point.

With the lid in place, the reservoir cover 6 is lifted as shown in FIG. 2 using the ledge 65 to disengage the securing pegs 62 from the peg recesses 26 and releasing the cover seal 64 from the lid 1. Visible in FIG. 1, the reservoir cover 6 is hingedly affixed to the lid 1 by hinges 61 on each side of the reservoir cover 6. Once the reservoir cover 6 is open, as shown in FIG. 2, the reservoir 12 can be filled with a substance through the reservoir hole 22, also called the filling port. The cover 6 is then closed and the lid is ready for use. The sealing created by the cover seal 64 around the filling port 22 must create a liquid-tight seal to prevent any leaking when the cup is in use or being transported.

In the preferred embodiment, if the cover 6 is open then the drinking access 21 is obstructed by the cover 6. When the reservoir cover 6 is open the cover seal 64 will desirably stay affixed to the reservoir cover 6 such as by overmolding. In alternative embodiments the seal could remain within the fill port opening. The cover seal 64 works by contacting the inner diameter of the filling port 22. Once the cover is closed, a single push of the button 5 will dispense a single, measured quantity of additive such as liquor. Additional button presses will increase the dose of additive to the beverage. The drinking hole 21 is freely accessible when the cover 6 is closed. The entire process of opening and closing the reservoir filling port 22 can be repeated without limitation.

Figure 3:
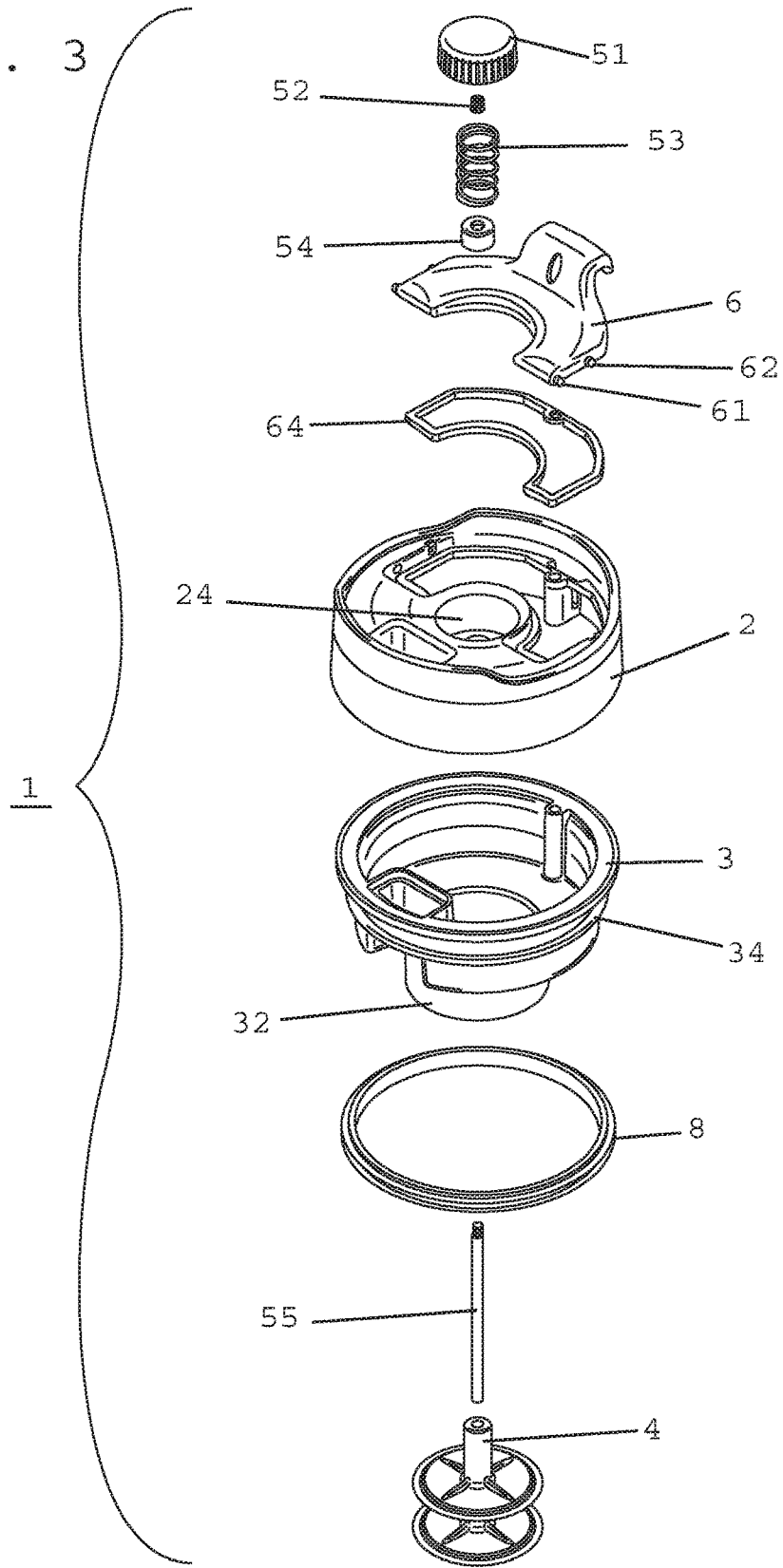
FIG. 3 is an exploded, perspective view of the components of the preferred embodiment of the present invention.

Turning to FIG. 3, the preferred embodiment of the lid is shown in an exploded view according to one mode of manufacturing. As shown, the preferred embodiment may be manufactured by separating the lid 1 into two halves. In this case, the reservoir 12 is formed by the combination and cooperation of a lid top 2 and a lid bottom 3, plus the reciprocating sealing mechanism illustrated as a double piston 4 controlled by the actuating button mechanism 5. Alternative modes of manufacturing that meet the objectives and limitations of the present invention will be apparent to those having skill in the art.

In this embodiment, the lid top 2 is aligned with the lid bottom 3 by the alignment of the upper and lower drinking channels and then the two lid pieces are sealed together by a water-tight sonic weld. In other embodiments, the top lid and bottom lid may be removably coupled together, heat sealed, or they may be constructed as a single unit such as through 3D printing. The lid top 2 provides the filling port 22 access to the reservoir after the assembly of the cover components. The cover seal 64 is affixed to the reservoir cover 6 and shaped to surround the filling port opening then the reservoir cover 6 is attached to the top lid 2 via the hinges 61 into the hinge receiving holes 27 and securing pegs 62 into the peg recesses 26. In shape, the lid bottom 2 forms the base of the reservoir and is slightly sloped inward (see FIGS. 7-9) toward the measuring tube 32 to urge the additives in the reservoir toward the open bottom 11 of the lid 1. With continuing reference to FIG. 3, the actuating mechanism 5 comprises a button 51, a threading insert 52, a spring 53, and a shaft seal 54 that are assembled into the button recess 24 and also attach to the shaft 55 and double piston 4 as shown in FIGS. 7-9. In the preferred embodiment, the shaft 55 is received through the center of the lid bottom 3 and lid top 2 while the double piston 4 remains within the lid bottom 3. The top of the actuating mechanism 5 is visible in FIGS. 1 and 2, and the assembled components of the actuating mechanism of the preferred embodiment are visible in later figures. Finally, the gasket 8 is secured to the lid bottom 3 at a seal ledge 34.

Figure 4:
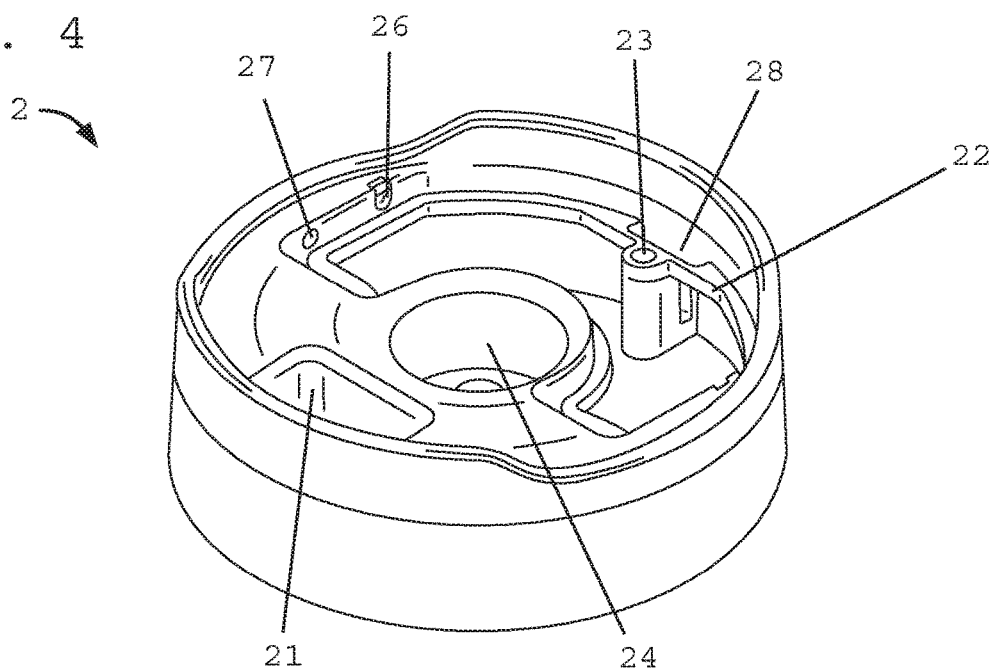
FIG. 4 is an isolated perspective view of the top member of the lid of FIG. 3.

Additional detail of the upper portions of the lid will be appreciated by referring to FIG. 4. FIG. 4 is an isolated view of the lid top 2 portion of the preferred embodiment as exploded in FIG. 3. This view clearly shows the hinge receiving hole 27 and peg receiving hole 26 which are mirrored on the opposite side of the lid (not visible in FIG. 4). The button recess 24 is in the center of the lid; however, alternative embodiments may call for the button recess to be off-center or to be located on the side of the exterior lid wall. The reservoir fill hole 22 encompasses more than half of the lid top 2 surface to aid the user seeking to fill the reservoir with additive. Opposite the reservoir fill hole 22 there is a rectangular hole comprising the drinking hole, also called the drinking access 21. By referencing FIGS. 4-9, one will appreciate that the drinking access 21 of the preferred embodiment has walls running through the lid top 2 to create a channel for drinking or receiving a straw to sip fluid from the cup by the consumer. In alternative embodiments, the drinking access may simply allow unobstructed or optionally closeable access to the tumbler cavity 72 via the interior wall 71 of the tumbler 7. The venting hole 23 opposite the drinking access 21 also communicates with a venting hole 33 within the lower lid 3 (see FIG. 5). Finally, FIG. 4 illustrates a reservoir vent 28 which consists of a thin slit along the side of the top wall of the lid top 2. This thin slit of the reservoir vent 28 permits the transfer of gas or air from the reservoir as the piston is depressed and may create a need to expel air as a result of the liquid transfer between sealed components.

Figure 5:
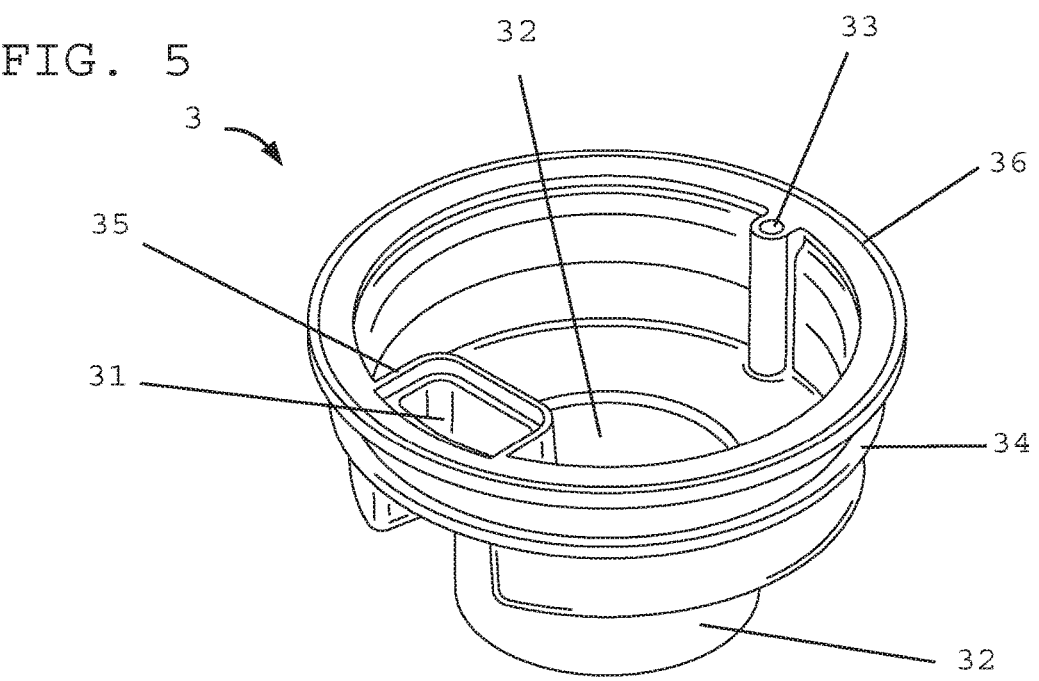
FIG. 5 is an isolated perspective view of the bottom member of the lid of FIG. 3.

FIG. 5 shows in isolation the lid bottom 3 illustrated in the exploded view of FIG. 3. Similar to FIG. 4 above, here the drinking channel 31 and venting hole 33 are visible and ready to be joined with the corresponding channels in the lid top 2. More particularly important for the preferred embodiment is the alignment lip 35 visible in this view as surrounding the drinking channel 31. This bottom alignment lip 35 mechanically receives a top alignment lip 25 (see FIG. 8) to keep the lid top 2 and lid bottom 3 from rotating relative to one another until and unless the consumer chooses to separate them for cleaning. The sonic-welded alignment of this embodiment can be more clearly seen in the cross-sectional view illustrated in FIGS. 7-9. In alternative embodiments, the lid top 2 and lid bottom 3 may be heat sealed, glued, or manufactured as one unit. In still other embodiments, the single unit design may provide another or additional point of interior access for cleaning. FIG. 5 further shows there are two ledges extending from the exterior wall of lid bottom 3. The first ledge 36 will rest at or near the top of the tumbler. The second ledge 34 will receive the gasket seal 8 (best shown in FIGS. 3 and 7-9).

Figure 6:
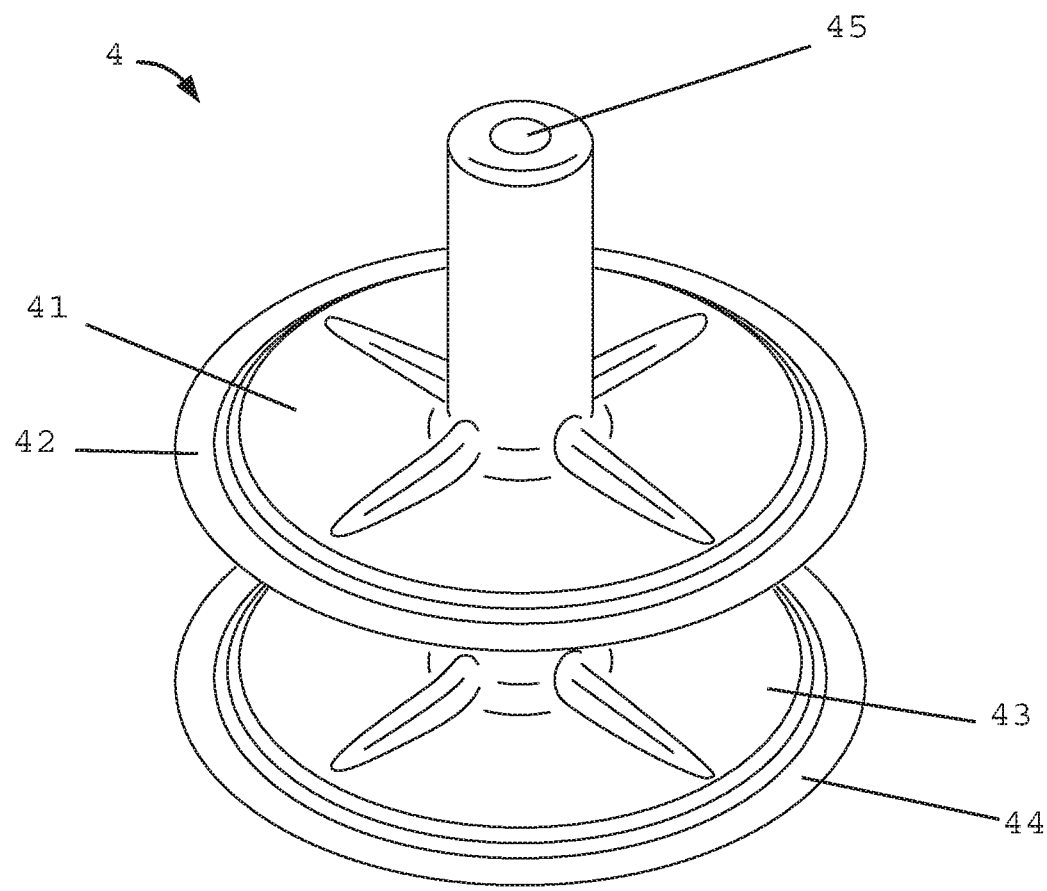
FIG. 6 is an isolated perspective view of the double piston of FIG. 3.

FIG. 6 is an isolated view of the double piston 4 (also called a double plunger) of the preferred embodiment. While functioning as the reciprocating sealing mechanism, the double piston 4 acts primarily to measure and disburse substances from the reservoir 12 to the tumbler 7. The double piston 4 is affixed to the actuating mechanism shaft 55 (see FIG. 3) via the through hole 45. In the preferred embodiment, the double piston is overmolded onto the shaft 55. An upper piston 41 is surrounded by an upper seal 42 and a lower piston 43 is surrounded by a lower seal 44. The upper and lower piston, or piston seals may be formed of a type such as a wiper seal. The upper and lower pistons are vertically set apart at a distance so that when they are in place inside of the measuring tube 32, approximately 0.5 ounces of fluid will fill the space between the two pistons and the interior wall 321. In alternative embodiments, the distance will be modified to permit alternative metering quantities and the sizing of the measuring tube may also need to be adjusted in diameter or height.

Through cross-sectional views, FIGS. 7-9 illustrate the movement of additive during operation of the device. In each of these figures the device is shown in use, the ledge 36 of the lower lid 3 is resting on the container 7 and the friction fit of the gasket 8 within the interior wall 71 of the container 7 is visible on each side. Further, the alignment of the lid top 2 and lid bottom 3 is confirmed by the alignment of the shared channels of the drinking channels 21, 31 and the venting holes 63, 23, 33 extending from the top of the lid through to the container 7. FIG. 7 shows the device in its default, or resting state which is reflected by the spring 53 being extended. The button 51 is in a raised position and the double piston 4 is raised so that only the lower piston 43 is creating a seal within the interior wall 321 of the tube 32. The upper piston 41 is above the interior wall 321 of the tube 32 allowing stored additive 91 to spill into the measuring tube from the reservoir 12.

Turning to FIG. 8, the button 51 is beginning to be depressed (such as by a user) which compresses the spring 53. The pressure moves the shaft 55 which in turn begins to move the double piston 4. The downward force of the button 51 also causes the shaft 55 and double piston 4 to move down. In FIG. 8 the button 51 has been depressed halfway to show both pistons are now creating a double seal on either end of the tube 32. The upper piston 41 is preventing more fluid from the reservoir 12 from being transferred to the measuring chamber 32 and the lower piston 43 is preventing any additive from moving into the tumbler 7. FIG. 8 illustrates that the preferred quantity of metered substance 92 has been trapped between the upper piston 41 and the lower piston 43. At the same time, the double piston is also keeping the metered content from escaping back into the reservoir or into the tumbler cup 7.

Finally, when the button 51 is fully depressed as shown in FIG. 9, the lower piston 43 of the double piston 4 is forced to exit the open bottom 11 of the tube 32. When the bottom of the lid is opened, the metered additive 92 shown trapped in FIG. 8 is released or spilled into the container 7 as illustrated by the lines 93 in FIG. 9. The upper piston 41 remains in the tube 32 and prevents additional stored additive substance 91 from being released from the reservoir 12. This final stage of an additive being transferred from one storage reservoir to another reservoir is visible in FIG. 9.

The preferred embodiment calls for the lid to be separated into two halves to make for easier molding and assembly. Cleaning of the exterior is easily accomplished and cleaning of the reservoir and measuring chamber areas is easily accomplished by access to the reservoir cover 6 and the actuating mechanism which will allow flushing of the reservoir and chamber areas. For alternative embodiments, when the lid is formed as a single unit, cleaning is similarly accomplished. Removal of the double piston will permit more thorough cleanings.

The preferred embodiment uses a vertical double plunger piston as the reciprocating sealing mechanism; however, any sealing mechanism that will alternatively seal a chamber entrance and a chamber exit may be employed. In particular, a retractable sealing mechanism may have particular utility as may a ratcheting or fanning filter shaped seal that articulates across the opening according to the objectives of the present invention.

This novel lid for capping a cup secures to the top of insulated cup and has a reservoir to store and repeatedly dispense measured quantities from the reservoir into the interior of the cup. Quantities of liquid are measured and dispensed via the cooperation of an upper and lower wall of a piston pump which creates an axial holding chamber when the upper and lower walls alternatively seal a measuring chamber. The upper seal of the piston creates the floor of the reservoir when the actuating mechanism is depressed. In the preferred embodiment, the measuring chamber is a cylindrical tube but any shape that will meet the objectives of the present invention is intended and considered within the knowledge of one skilled in the art. When the measuring chamber is cylindrical then the piston and wiper seals would also be cylindrical. The interior wall of the metering tube interfaces with the two radially extending horizontal walls of the double piston. Each horizontal wall is circumscribed by a cylindrical wiper seal. The upper seal of the piston pump is shaped to surround the disk shape of the upper, substantially horizontal wall. The upper seal alternatively extends into the reservoir to create a spillway in the measuring chamber and then the upper seal descends into the measuring chamber when a button on the top of the lid is pressed by a user. The lower seal of the piston pump will also be shaped to surround the disk shape of the lower, substantially horizontal wall and alternatively creates the bottom of the measuring chamber when the upper seal is in the reservoir and then when the button is depressed the lower seal extends into the cavity 72 of the cup and spills the contents from the measuring chamber into the cup. As the lower seal is spilling the contents of the holding chamber into the cup the upper seal is partitioning the reservoir contents to remain within the reservoir.

The release of the button automatically returns the piston pump to the upper, resting position which once again sequesters the reservoir contents from the cup contents. The cap has a filling access to allow the reservoir to be unlimitedly refilled. The cap has a drinking access which permits the cup to be used as normal without the contents of the cup coining into contact with the contents of the reservoir when the cup is tipped for drinking.

The capping lid of the present invention comprises a refillable reservoir section which is located within the lid and above the measuring channel. The measuring channel has a proximal aperture and a distal aperture which are selectively blocked by the reciprocating sealing mechanism. The actuating mechanism, mechanically joined with the reciprocating sealing mechanism, controls the movement of the reciprocating sealing mechanism. A drinking access is formed by a wall that traverses the various portions of the lid and prevents the stored liquid from contacting the substance of the beverage container due to normal drinking functions of the cup. The drinking access should desirably be provided with its own cover to allow selective closing of the tumbler cavity. The combination of the refillable reservoir section and the reciprocating sealing mechanism cooperate to receive and enclose an additive within the lid. The additive may be any liquid or powder such as flavoring, syrup, oil, herbal supplements, mineral supplements, vitamin supplements, dietary supplements, honey, creamer, liquor, spirits, or similar substances that are normally added to a larger quantity of liquid. The preferred additive used in this lid will be liquid in nature. The invention will be particularly useful for adding a quantity of hard alcohol to a mixer to form a cocktail while on the go. The larger quantity of liquid is typically of a type such as soda, coffee, juice, water, sparkling water, or tea. The lid permits the disbursement into the beverage container of additive from the distal aperture of the measuring channel in measured and repeatable quantities.

The lid of the present invention is desirably constructed of a resin that is substantially translucent or transparent. The use of transparent manufacturing materials will allow a user to observe when the contents of the reservoir are full, empty, getting low, or being disbursed. The lid is constructed of resilient materials and is intended to have longevity so that it can be reused for an undefined, indefinite period. The lid can be coupled to various containers and repeated attachment is desirable and intended. The reservoir may be repeatedly accessed, emptied, refilled and cleaned.

The button, shaft, spring, seals, threading inserts, and various other components may be selected from conventional parts available on the market. Other components will be custom molded and overmolded before the lid is assembled. The preferred embodiment the double piston is overmolded but a commercially available rigid plastic double piston could be adopted with removable or affixed wiper seals. The sizing of the button, the button recess, the shaft, the spring, and other components may vary depending on the size of the lid. The depth, size and shape of the metering tube will impact the dimensions of these actuating mechanism parts. The height of the push button is dependent on the clearance needed to move the partition created by the double seals of the reciprocating sealing mechanism.

The reciprocating sealing mechanism selectively seals in the following configurations:
  blocking of the distal aperture of the measuring channel simultaneously with the unblocking of the proximal aperture of the measuring channel,
  simultaneous blocking of the proximal aperture of the measuring channel and the distal aperture of the measuring channel,
  blocking of the proximal aperture of the measuring channel simultaneously with the unblocking of the distal aperture of the measuring channel, and
  the various stages in between these enumerated examples.

In the preferred embodiment of the present invention, when the reciprocating sealing mechanism seals the distal aperture it also unseals the proximal aperture, allowing up to a specific volume of additive to enter the measuring channel from the refillable reservoir section. When the reciprocating sealing mechanism moves to seal the proximal aperture it also seals the distal aperture allowing up to a specific quantity of additive to enter and be housed in the measuring channel. When the reciprocating sealing mechanism moves to seal the proximal aperture it also unseals the distal aperture allowing up to the specific quantity of additive to exit the measuring channel into the beverage container. Before the additive is transferred into the beverage compartment it is sealed off from the lid reservoir by the reciprocating sealing mechanism. The actuating mechanism moves the reciprocating sealing mechanism to block passage of the additive from the reservoir into the measuring channel and unblock the flow from the measuring channel to beverage container.

The default position of the reciprocating sealing mechanism allows additive to pass into the measuring channel from the refillable reservoir section. The actuating mechanism automatically returns to rest in a default position which seals the lid contents from the beverage container. When the distal aperture of the measuring channel is sealed and the proximal aperture of the measuring channel is unsealed, the measuring channel fills with up to a specific quantity of additive so long as there are sufficient contents available from the reservoir. When the proximal aperture of the measuring channel is closed, the refillable reservoir section is also closed and the specific quantity of additive is disbursed into the beverage container. When the distal aperture of the measuring channel is sealed, the measuring channel is in fluid communication with the reservoir. When the proximal aperture of the measuring channel is sealed, the measuring channel is in fluid communication with the beverage container.

The specific quantity measured by the lid can vary depending on the size of the lid and the desired function for the lid. Insulated containers take on a wide range of sizes and volumes so having lids formed of a similarly wide range of sizes is anticipated. Growler-sized HydroFlask™ waterbottles may call for a lid having an interior volume of many more ounces than a 20-ounce Yeti® tumbler cup. The preferred embodiment will have height dimensions of about 3 inches from the base of the measuring chamber to the top of the button in the default position, alternative heights may be used to increase or decrease the reservoir capacity but would encroach upon the volume of the tumbler or cause the lid to protrude from the top of the tumbler further. One preferred embodiment lid, sized to fit a tumbler with a 30 to 35-ounce capacity, has a top diameter of approximately 4 inches across and 4.4 inches when the lift tab is included and is 3 inches in height. The lower lid piece (reservoir lower wall) inclusive of the measuring chamber is approximately 2.3 inches in height and approximately 1.75 inches would be recessed into the tumbler. For a smaller preferred embodiment of the lid, sized to fit a tumbler between 20 and 24 ounces in size, the diameter of the lid top is approximately 3.5 inches and the height of the entire lid accessory is approximately 3 inches.

A conventional tumbler typically holds anywhere from 12 to 35 ounces of liquid beverage. For these quantities, the cap reservoir will have a volume of 1-7 ounces (about 30 mL-100 mL) with the preferred volume being between 4 and 6 ounces for cups between 20 and 35-ounces in size. The measuring tube may have variation in size commensurate with the tumbler's volume but such variation is not mandatory since repeated actuation will result in repeated dosing of additive into the cup cavity. For a typical tumbler, the lid will meter and dispense an additive at a rate of approximately ½ ounce (about 15 milliliters) per button press. Thus, when the button is pressed twice, 1 ounce (about 30 mLs) of additive will enter the tumbler's interior cavity, and so forth. At a minimum, after the button has been pressed twice, the reservoir will still hold at least one ounce of additive which will permit another full use of the additive such as may be desired when a small tumbler is refilled with a primary beverage.

The tumbler is refilled by removing the lid from the tumbler. In most cases this will require the user to ease the lid away from the tumbler in order to release the sealing gasket's hold against the tumbler's interior wall. The primary beverage is refilled in the tumbler's cavity and then the lid is replaced onto the tumbler. Once the sealing gasket is again secure, the user presses the button to once again dispense the secondary substance (additive) from the reservoir into the tumbler cavity. If this use partially depletes or completely exhausts the supply of the additive in the reservoir then the user will open the reservoir cover 6 and refill the reservoir by pouring additional additive through the reservoir fill hole 22.

The lower wall of the refillable reservoir section is shaped to descend toward the measuring channel in order to allow additive to spill from the reservoir when the proximal aperture of the measuring channel is unsealed. The proximal aperture of the measuring channel, and thus the reservoir's floor is sealed before additive spills into the beverage container so that the amount of additive is controlled and the reservoir's contents remain segregated and secure.

The present invention for a beverage container lid will find use with most to all standard or conventional, reusable cups having a beverage compartment wherein the beverage container further comprises a bottom wall, an annular wall having an exterior and an interior, and a top opening. The present invention attaches to cover the top opening via an interference fit seal on the interior of the axially extending wall; however, other means of coupling such as screwing or snapping as well as covering the top opening via a seal with the exterior wall are known in the art and, because they may be useful with some conventional container models, are considered within this disclosure.

The lid requires a reservoir having a filling port vertically spaced from a measuring tube. The filling port is reclosable via a door or similar access point. The filling port is in fluid communication with the measuring tube. The lid also calls for a drinking channel having a vertical wall partitioning the drinking channel from the lid reservoir, the filling port, and the measuring tube. The drinking channel should further allow access for consuming the contents of the beverage compartment of the tumbler. The lid is repeatedly coupled to the beverage container opening while the lid reservoir and the reciprocating sealing mechanism cooperate to receive and enclose an additive within the beverage container lid. The actuating mechanism of the present invention is controlled by a user to move the reciprocating sealing mechanism to release the additive into the measuring tube and then into the beverage compartment. In the preferred embodiment, the actuating mechanism comprises a rigid button which cooperates with a spring. Alternative configurations for a dispenser are known in the art and include mechanisms such a depressible bulb style dispenser, a press cylinder style dispense, a plunger atop the lid, a flexible dome, or a trigger atop or alongside the lid.

Through the use of this metered lid for a beverage container having a distal bottom, an annular wall, and a proximal opening, a measured quantity of liquid additive is dispensed into the beverage container. In the preferred embodiment, the dispensing occurs through a piston actuator with horizontal seals that translate the liquid from the reservoir into an axial holding chamber and then release the liquid when the bottom seal passes the axial chamber opening.

When using the FlasKap branded embodiment of the present invention, the following steps are followed:
1. The user puts the lid device down in the cup and in the same manner as if installing a standard lid on the cup. The device is secured on the cup by friction via a gasket.
2. The user opens the fill cap located on the top of the lid and fills the reservoir full of liquid, in this example liquor or spirits, also called booze. The fill cap is located on the side opposite of the drink hole. The typical reservoir holds approximately 5-7 ounces of liquor.
3. The user empties liquor out of the device down into the cup by pushing the button down in the center of the lid. Each time the button is pushed approximately ½ ounce of liquor flows down into the cup. The user can choose how much is emptied down into the cup by the number of pushes made to the button. The metering device works because in its "resting" position liquor is allowed to flow down into the measuring chamber located at the bottom of the reservoir but cannot escape into the cup cavity. The chamber consists of a cylinder shape with open ends. One end opens to the reservoir and the other end opens down into the cup. The piston which consists of two disks with gaskets around the perimeter keep the liquor from flowing until the button is pushed down. When the button is pushed down the upper disk will seal off liquor from coining into the chamber from the reservoir while the bottom disk will protrude out past the end of the chamber allowing the liquor to flow by gravity down into the cup. When the user then lets off the button the coil spring located at the piston under the button brings the piston back up into its "resting" position and the liquor is allowed to fill the chamber back up and the bottom of the disk seals off the liquor from flowing down into the cup.

The commercial product branded as the FlasKap lid is designed to be a multi-functional tumbler lid and beverage insulator+flask+shot dispenser that is spill and splash resistant with precision cutting to fit a user's stainless-steel travel tumbler. The FlasKap lid keeps liquids in and dust out while a user is at work, traveling, or exercising. The FlasKap lid works like a regular lid in that it is insulated to keep ice in a cup longer or keep a beverage hot longer. While not every stainless-steel drink tumbler is the same, the FlasKap lid provides universal design to allow versatility so that this lid fits nearly all tumblers on the market. The FlasKap lid is particularly designed for use on Yeti®, Ozark Trail™, Grizzly™, Boss™, Sic™, Reduce®, Rtic® and so much more. This lid is dishwasher safe and made with premium, BPA-free plastic. The FlasKap lid can safely be added to the top rack of a dishwasher to wash along with other drinkware and kitchen items. The design is discreet, and from the top looks like any other lid on the market yet the addition of this lid makes a tumbler different and better than other tumblers. This lid permits the user to customize the tumbler already owned. The FlasKap lid is portable and convenient, eliminating the need for an additional container (bottle, flask, shot glass).

It is further intended that any other embodiments of the present invention which result from any changes in application or method of use or operation, method of manufacture, shape, size, or material which are not specified within the detailed written description or illustrations contained herein yet are considered apparent or obvious to one skilled in the art are within the scope of the present invention.

What is claimed is:

1. A lid for a beverage container comprising:
a refillable reservoir section,
a measuring channel having a proximal aperture and a distal aperture,
a reciprocating sealing mechanism for selectively blocking the proximal aperture and distal aperture,
an actuating mechanism mechanically joined with the reciprocating sealing mechanism controls movement of the reciprocating sealing mechanism,
a drinking access,
wherein the refillable reservoir section and the reciprocating sealing mechanism cooperate to receive and enclose an additive within the lid,
the drinking access having a wall partitioning the drinking access from the additive within the lid,
the lid permitting disbursement into the beverage container of the additive from the distal aperture in measured and repeatable quantities.

2. The lid of claim 1, wherein the lid further comprises coupling permitting repeated attachment to the beverage container.

3. The lid of claim 1, wherein the reciprocating sealing mechanism selectively seals in the following configurations:
blocking of the distal aperture of the measuring channel simultaneously with the unblocking of the proximal aperture of the measuring channel,
simultaneous blocking of the proximal aperture of the measuring channel and the distal aperture of the measuring channel,
blocking of the proximal aperture of the measuring channel simultaneously with the unblocking of the distal aperture of the measuring channel, and
various stages in between these enumerated stages.

4. The lid of claim 1, wherein a default position of the reciprocating sealing mechanism allows the additive to pass into the measuring channel from the refillable reservoir section.

5. The lid of claim 1, wherein the reciprocating sealing mechanism is a plunger piston.

6. The lid of claim 1, wherein the refillable reservoir section is shaped to allow the additive to spill into the measuring channel when the proximal aperture is unsealed.

7. The lid of claim 1, wherein the additive is a liquid.

8. The lid of claim 7, wherein when the distal aperture of the measuring channel is sealed, the measuring channel is in fluid communication with the refillable reservoir section.

9. The lid of claim 7, when the proximal aperture of the measuring channel is sealed, the measuring channel is in fluid communication with the beverage container.

10. The lid of claim 1, wherein the actuating mechanism automatically returns to rest in a default position which seals the lid from the beverage container.

11. The lid of claim 1, wherein the actuating mechanism may be operated an indefinite number of times.

12. The lid of claim 1, wherein the actuating mechanism is a button located on the lid.

13. The lid of claim 1, wherein the refillable reservoir section holds a volume that is at least twice as large as that of the measuring channel.

14. The lid of claim 1, wherein the refillable reservoir section further comprises a hinged cover access to allow refilling and reclosing.

15. The lid of claim 1, wherein additive is poured into the refillable reservoir section through a filling port with a hinged cover.

16. The lid of claim 1, wherein the drinking access further comprises a closure.

17. The lid of claim 1, wherein operation of the lid transfers a metered quantity of the additive from the reservoir section to the beverage container.

18. A beverage container lid for use with a conventional reusable cup having a beverage compartment with a drinking opening, the beverage container lid comprising:
a lid reservoir having a filling port vertically spaced from a measuring tube,
the filling port having a reclosable access,
the filling port in fluid communication with the measuring tube,
the measuring tube having a proximal aperture and a distal aperture,
a reciprocating sealing mechanism selectively seals the measuring tube,
an actuating mechanism connects with the reciprocating sealing mechanism,
wherein the beverage container lid repeatedly couples to the drinking opening,
wherein the lid reservoir and the reciprocating sealing mechanism cooperate to receive and enclose an additive within the beverage container lid, and
wherein the actuating mechanism controls the movement of the reciprocating sealing mechanism to release the additive into the measuring tube and then into the beverage compartment for repeated disbursement of an apportionment of an additive.

19. The beverage container lid of claim 18, further comprising
a drinking channel having a vertical wall partitioning the drinking channel from the lid reservoir, the filling port, and the measuring tube,
the drinking channel further allowing access to the beverage compartment.

20. The beverage container lid of claim 18, wherein before the additive is released into the beverage compartment it is sealed off from the lid reservoir.

21. The beverage container lid of claim 18, wherein the actuating mechanism moves the reciprocating sealing mechanism to block passage of the additive from the lid reservoir into the measuring tube and unblock the flow from the measuring tube into the beverage container.

22. A tumbler-compatible lid comprising:
a gasket seal to interface and create a liquid-tight seal with a conventional beverage container,
an open bottom,
a reservoir, wherein the reservoir is comprised of:
a lid top piece forming a top wall of the reservoir and the lid top piece having,
a reservoir fill hole disposed atop the lid top piece and encompassing approximately half of the top wall,
a button recess to receive a button actuating mechanism,
a first alignment lip,
a reservoir vent traversing the top wall above the reservoir,
the lid top piece further having attachment points for a hinged reservoir cover which seats into the reservoir fill hole,
a lid bottom piece comprising a bottom wall of the reservoir and the lid bottom piece having, a metering tube having an interior wall to interface with a double piston to receive a metered volume, wherein the double piston further comprises a vertical shaft and two radially extending horizontal walls, each horizontal wall circumscribed by a wiper seal, a second alignment lip communicates with the first alignment lip, the first alignment lip and second alignment lip surround a drinking channel and cooperate to hold the top lid piece and the lid bottom piece in non-rotational alignment, a container ledge to receive a top opening of the conventional beverage container, a beverage container vent hole traverses the reservoir to allow air flow from the conventional beverage container during drinking, when joined, the lid top piece and the lid bottom piece create a liquid-tight reservoir with a shape and size to complement the top opening of the conventional beverage container, the drinking channel traverses each of the top lid piece and bottom lid piece, the button actuating mechanism mechanically attaches to the double piston and controls the movement of the double piston within the metering tube to alternatively create fluid communication between the reservoir and the open bottom.

\* \* \* \* \*